J. C. & J. A. SWINDELL.
REVERSING VALVE FOR FURNACES.
APPLICATION FILED JUNE 16, 1908.
908,353.
Patented Dec. 29, 1908.
5 SHEETS—SHEET 4.
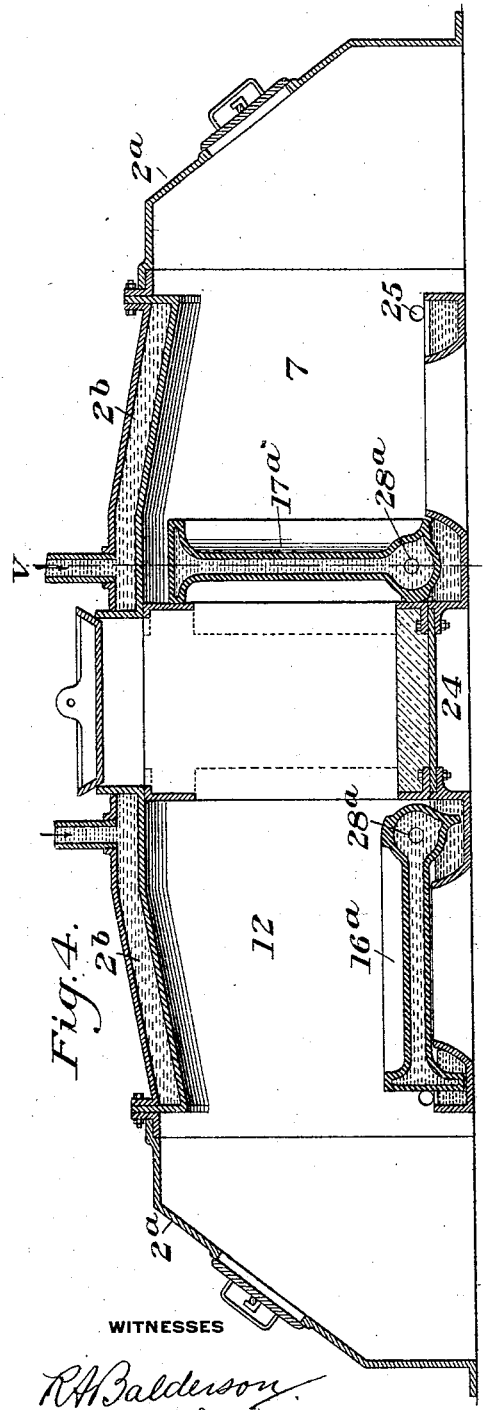
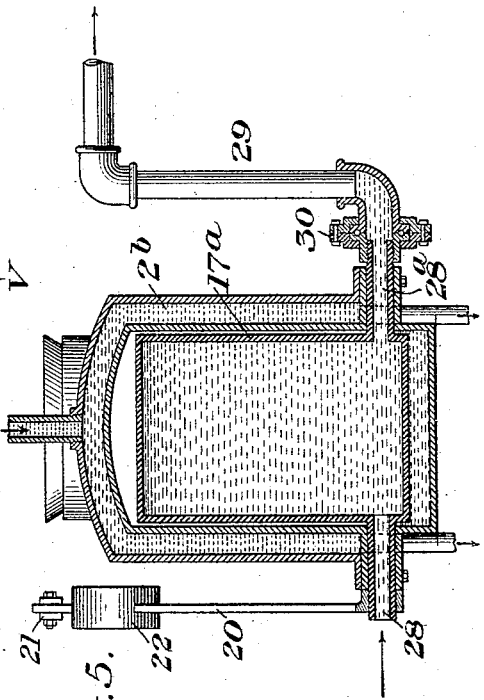
WITNESSES
INVENTORS
J. C. Swindell
J. A. Swindell
by Bakewell, Byrnes & Parmelee,
their Attys.

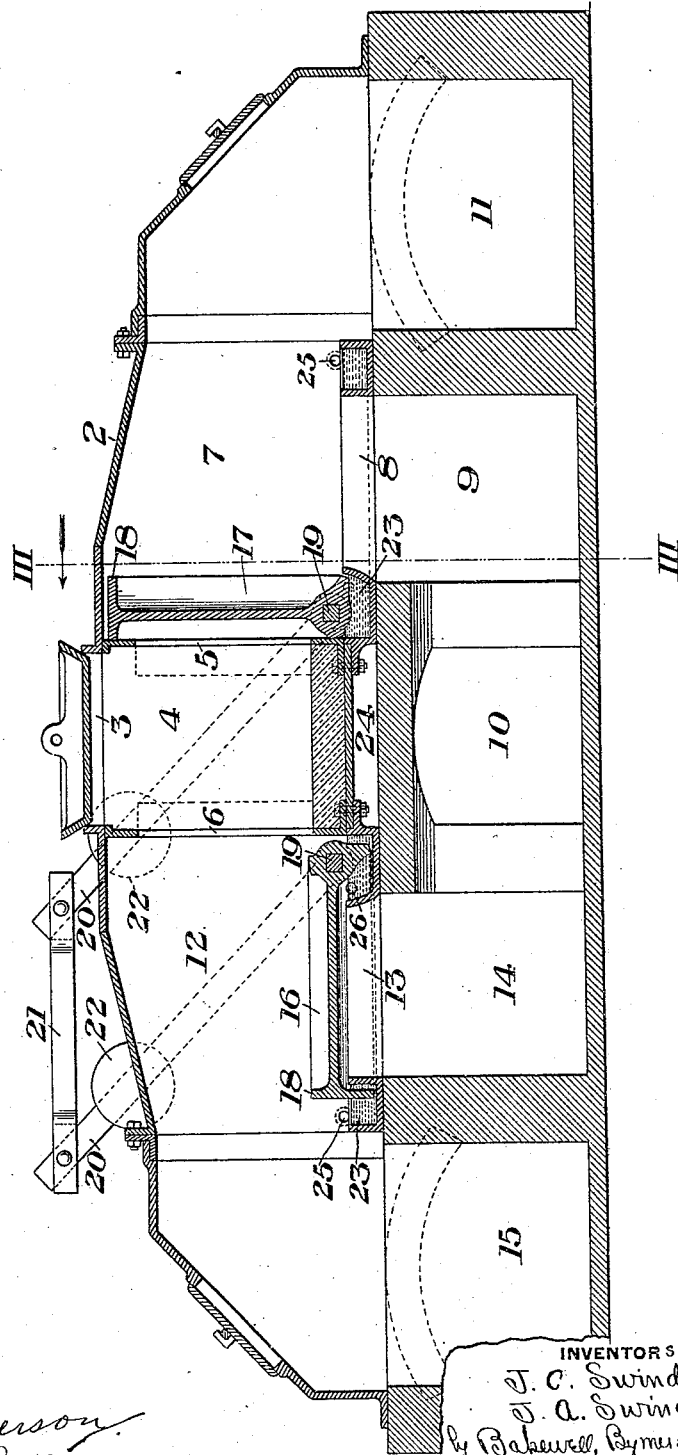

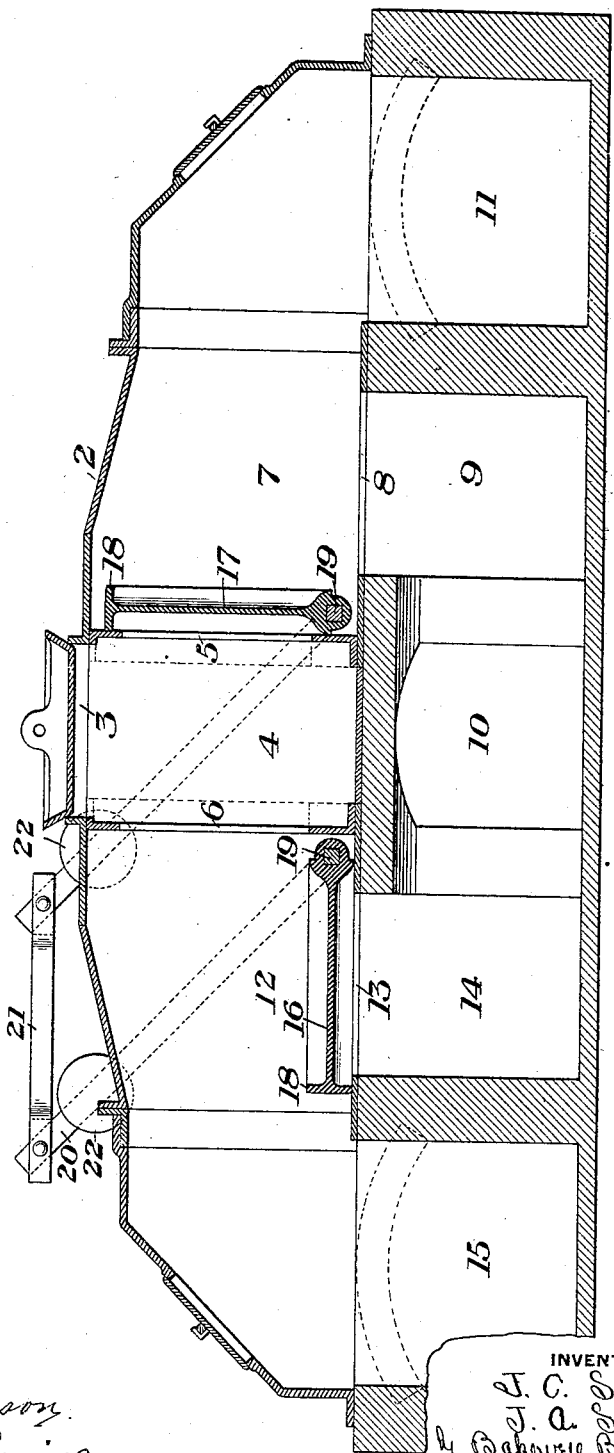

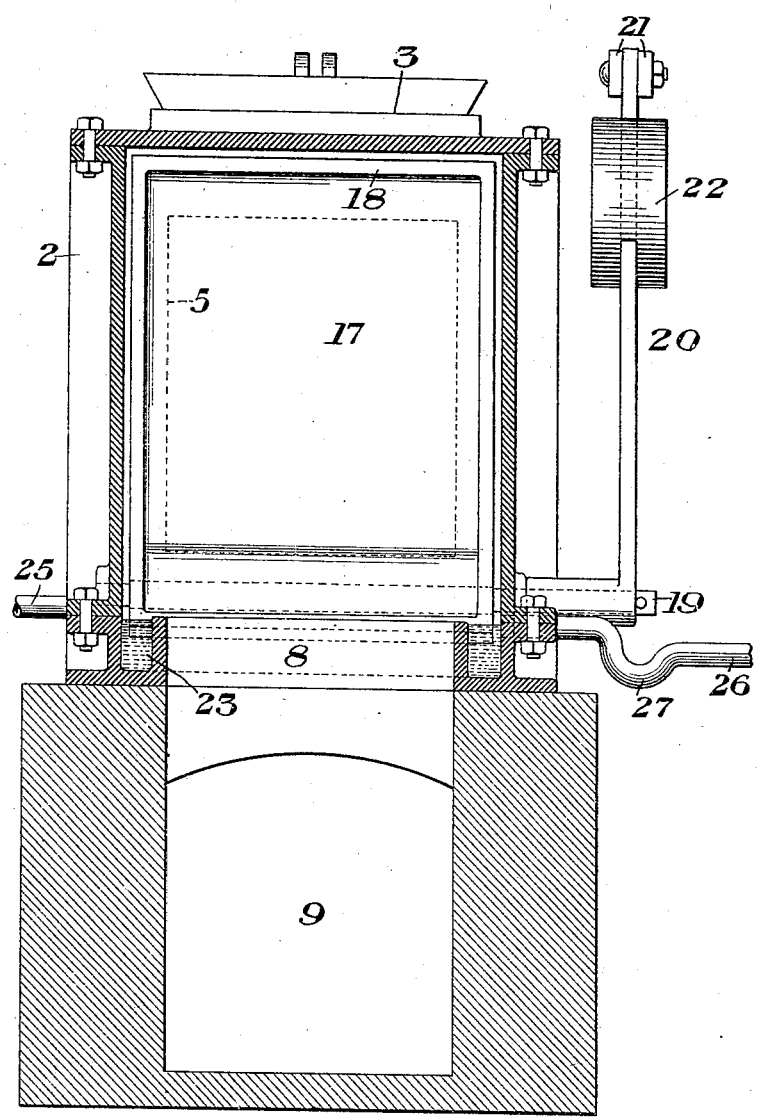

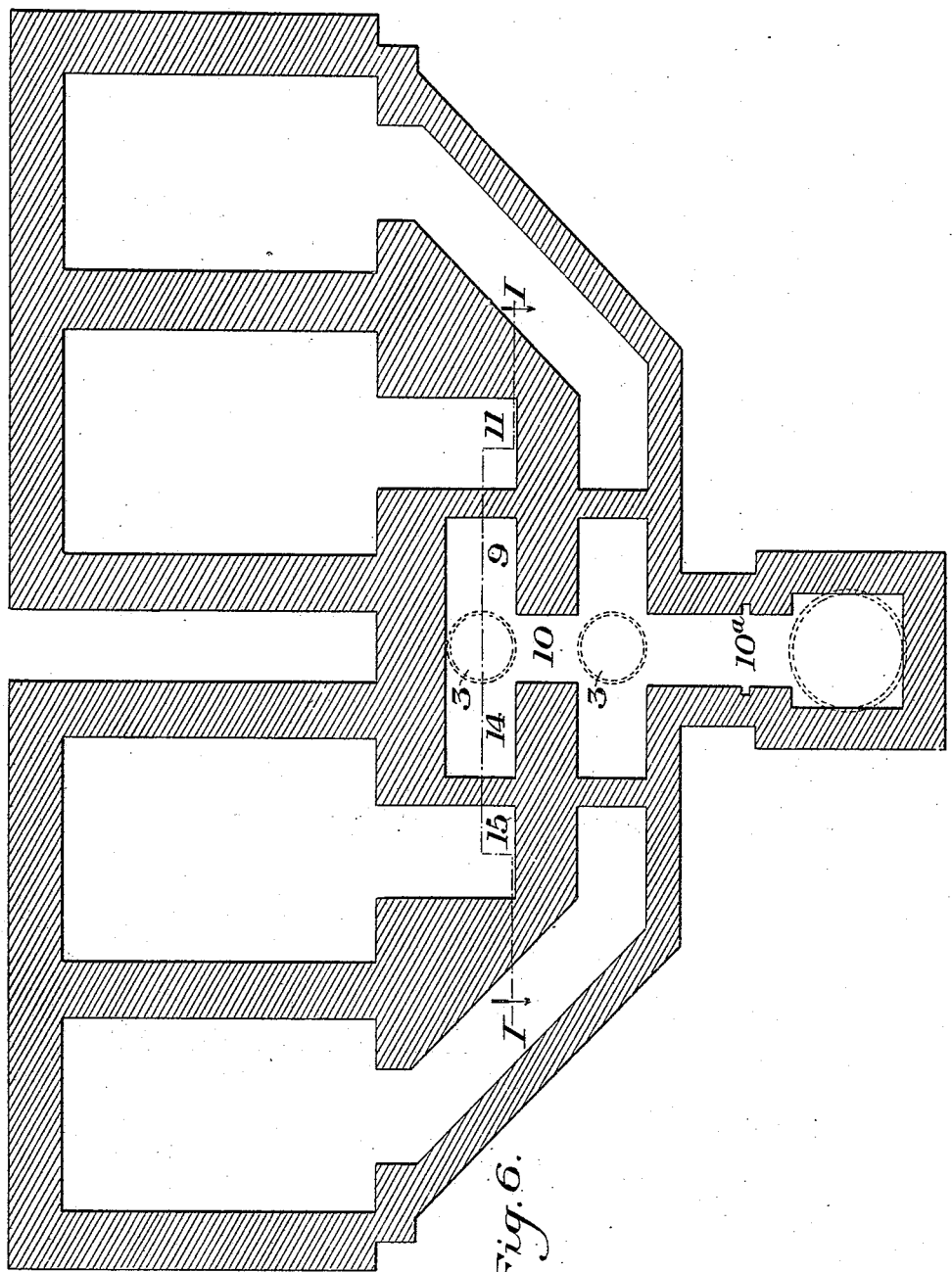

UNITED STATES PATENT OFFICE.

JOHN C. SWINDELL AND JOHN A. SWINDELL, OF RESERVE TOWNSHIP, ALLEGHENY COUNTY, PENNSYLVANIA.

REVERSING-VALVE FOR FURNACES.

No. 908,353.  Specification of Letters Patent.  Patented Dec. 29, 1908.

Application filed June 16, 1908. Serial No. 438,765.

*To all whom it may concern:*

Be it known that we, JOHN C. SWINDELL and JOHN A. SWINDELL, both of Reserve township, Allegheny county, Pennsylvania, have invented a new and useful Reversing-Valve for Furnaces, of which the following is a full, clear, and exact description, reference being had to the accompanying drawings, forming part of this specification, in which—

Figure 1 is a vertical longitudinal section of one form of a reversing valve embodying my invention, the section being taken on the line I—I of Fig. 6; Fig. 2 is a similar view showing a modification; Fig. 3 is a vertical section on the line III—III of Fig. 1; Fig. 4 is a longitudinal section showing a further modification; Fig. 5 is a vertical section on the line V—V of Fig. 4; Fig. 6 is a horizontal section through the regenerators and ports.

Our invention has relation to reversing valves for regenerative furnaces, and is designed to provide a simple and efficient form of valve which can be readily operated to control the several gas or air ports; also to provide means of simple and effective character for water-sealing the movable valve members.

The precise nature of our invention will be best understood by reference to the accompanying drawings, in which we have shown two different embodiments thereof, and which will now be described, it being premised, however, that various changes may be made therein by those skilled in the art without departing from the spirit and scope of our invention as defined in the appended claims.

Referring first to the form of the invention shown in Figs. 1 and 3, the numeral 2 designates the casing of the valve, which is provided with the usual inlet opening or port 3 for the air or gas, said port 3 leading into the central chamber 4 having the ports 5 and 6 at its opposite sides. The port 5 opens into a chamber 7, which is connected by a port 8 with an outlet chamber 9 leading to the off-take 10 to the stack 10ª. The chamber 7 also opens into the chamber 11, which leads to one end of the furnace controlled by the valve. The port 6 opens into a chamber 12, which is connected by a port 13 with a passage or chamber 14 which also communicates with the offtake 10. The chamber 12 also communicates with the passage 15 leading to the opposite end of the furnace from the passage 11.

16 and 17 designate the two movable valve members, which control the ports 5 and 6 and also the ports 8 and 13. These members each consist of a web having marginal vertical flanges 18 projecting from both sides thereof. Each of these valve members is secured to a transverse rock shaft 19, which extend outwardly through the casing 2, and which are provided at one end with the parallel arms or levers 20 connected by a bar 21 and having weights 22 which act to hold the valves in the position to which they are moved.

The two valve members stand at right angles to each other, so that when the valve 17 is in the vertical position shown in Fig. 1, the valve member 18 is in the horizontal position shown in said figure. By operating the bar 21 the two valves are moved in unison. Surrounding the ports 8 and 13 are troughs 23, in which the projecting flanges 18 of the valve members seat when said members are in horizontal position. The shafts 19 lie above these troughs, so that, when the valves are in vertical position, their lower edge portions will be within the troughs to form seals for the lower edge of the valves. The troughs also form means for cooling the walls of the ports 8 and 13 when said ports are open to the passage of hot gases therethrough.

With the valve in the position shown in Fig. 1, the air or gas entering at 3 passes through the port 6 into the chamber 12, and thence to the passage 15 leading to one end of the furnace. The gases from the furnace pass from the furnace into the passage 11 and from thence into the chamber 9 through the port 8 and then to the off-take 10.

In the reverse position of the valve, the port 6 is closed, port 13 is opened, and port 8 is closed and port 5 opened. The entering air or gas will then pass through the port 5 and to the passage 11, while the gases from the furnace going out from the passes 15 pass through the port 13, and thence through the chamber 14, from the off-take 10.

The air space 24 is preferably provided below the bottom of the central chamber so as to provide for the circulation of air to assist in cooling the parts.

In the form of the invention shown in Fig. 2, the construction is the same as that shown in Figs. 1 and 2, except that the water-sealing troughs are omitted. Corresponding reference numerals designate the same parts in this figure as in Figs. 1 and 3.

In the modification shown in Figs. 4 and 5, the valve casing 2ª is shown as provided with a water jacket 2ᵇ. The movable valve members 16ª and 17ª are each shown as hollow for the purpose of providing an interior water space so that they may be kept filled with water and thus water-cooled. This water can be introduced through one of the hollow shafts or trunnions 28, and discharged through the opposite shaft or trunnion 28ª, as shown in Fig. 5, the discharge pipe 29 being trapped to keep the valve members full when in their raised positions and having a rotatable connection at 30 with the end of the trunnion 28ª.

By means of our invention we provide an extremely simple form of reversing valve, which may be conveniently and readily operated, but little power being required for the operation since the dominant movement of one valve member assists in raising the other valve member. It will be noted that when the valve members are in the horizontal position, their flanges are immersed at all four sides in the water-troughs, and are thereby kept sufficiently cool to prevent injury thereto. When the valve members are in vertical position their lower portions are still immersed in the water. These water troughs may be supplied with cold water by any suitable arrangement of circulating pipes. Thus, 25 in Fig. 3 designates an inlet pipe, and 26 an outlet pipe having the trap bend 27 therein to prevent escape of gas with the water or the entrance of air. Instead of water, sand may be used in the troughs 23.

Fig. 6 shows the flue arrangement for both the gas and air ports of a regenerative furnace.

It will be apparent that many changes may be made in our invention. Thus, any suitable means may be employed for moving the valve members from one position to another; the arrangement of the water seals may be changed, and various other changes may be made in the details of construction and arrangement of the parts.

What we claim is:—

1. In a reversing valve, a valve casing having an inlet chamber with opposite lateral ports, and a pair of flap valves arranged to control said ports, said valves being pivoted at their lower edges and set at approximately ninety degrees to each other whereby one of said ports is closed when the other is opened, and two other ports opening downwardly at opposite sides of said chamber and also controlled by said valves; substantially as described.

2. In a reversing valve, a valve casing having an inlet chamber with opposite lateral ports communicating with opposite ends of the furnace, two other ports also communicating with opposite ends of the furnace and leading to a stack flue or offtake, and a pair of connected flap valves set at different angles and each controlling one port of each pair of ports said valves being pivoted at their lower edges; substantially as described.

3. In a reversing valve, a valve casing or structure, having an inlet chamber with two opposite inlet ports communicating with opposite ends of the furnace, an offtake port, and two ports communicating with opposite ends of the furnace, and also with the offtake ports, a pair of double-seating flap valves pivoted at their lower edges and each of which is arranged to control one port of each pair of said ports, and means for actuating the two valves simultaneously, said valves being at an angle to each other; substantially as described.

4. In a reversing valve, a valve casing having an inlet chamber provided with opposite lateral ports, communicating with opposite ends of the furnace, two other ports at substantially right angles to the first-named ports and connecting opposite ends of the furnace with an offtake flue, and a pair of pivoted double-seating flap valves set at substantially right angles to each other, and each controlling one of the first named ports and one of the last named ports, and open water troughs forming seals for said valves in one position of each and port cooling means in the other positions of the valves; substantially as described.

5. In a reversing valve, a valve casing having a centrally located inlet chamber with opposite lateral ports leading therefrom, and two other ports at opposite sides of said chamber and at an angle to the first-named ports, open water troughs surrounding the last-named ports, and two double seating flap valves set at an angle to each other and controlling the four ports, said valves having an edge portion within said troughs in one position and also having projecting flanges which lie in said troughs in the other positions of the valves; substantially as described.

6. In a reversing valve, a valve casing having a centrally located inlet chamber formed with an air space below its bottom and between the bottom thereof and the top wall of the off-take ports, said chamber having opposite lateral ports, and a pair of flap valves arranged to close said ports, said valves being set at approximately ninety degrees to each other, together with means for simultaneously actuating the valve members; substantially as described.

7. A reversing valve, comprising two flaps each pivoted at its lower edge, the two valves being set at approximately ninety degrees to each other, and each valve having two seating positions and two ported seats at approximately right angles to each other, open water troughs into which the pivoted edges of the valves extend, and actuating connections for moving the two flaps in unison; substantially as described.

In testimony whereof, we have hereunto set our hands.

JOHN C. SWINDELL.
JOHN A. SWINDELL.

Witnesses:
GEO. H. PARMELEE,
H. M. CORWIN.